(12) United States Patent
Chalamalasetti et al.

(10) Patent No.: US 11,868,855 B2
(45) Date of Patent: Jan. 9, 2024

(54) RESILIENCY FOR MACHINE LEARNING WORKLOADS

(71) Applicant: HEWLETT PACKARD ENTERPRISE DEVELOPMENT LP, Houston, TX (US)

(72) Inventors: Sai Rahul Chalamalasetti, Palo Alto, CA (US); Sergey Serebryakov, San Jose, CA (US); Dejan S. Milojicic, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 711 days.

(21) Appl. No.: 16/673,868

(22) Filed: Nov. 4, 2019

(65) Prior Publication Data

US 2021/0133624 A1   May 6, 2021

(51) Int. Cl.
*G06N 20/00*    (2019.01)
*G06F 16/901*   (2019.01)
*G06F 21/60*    (2013.01)

(52) U.S. Cl.
CPC .......... *G06N 20/00* (2019.01); *G06F 16/901* (2019.01); *G06F 21/602* (2013.01)

(58) Field of Classification Search
CPC ...... G06N 20/00; G06F 16/901; G06F 21/602
See application file for complete search history.

(56) References Cited

U.S. PATENT DOCUMENTS

| | | | |
|---|---|---|---|
| 9,811,074 B1* | 11/2017 | Aichele | B25J 9/1656 |
| 11,227,187 B1* | 1/2022 | Weinberger | G06N 3/08 |
| 2016/0162779 A1* | 6/2016 | Marcus | G06N 20/10 |
| | | | 706/12 |
| 2016/0217368 A1* | 7/2016 | Ioffe | G06N 3/0454 |
| 2018/0293462 A1* | 10/2018 | Ambati | G06N 5/022 |
| 2020/0134387 A1* | 4/2020 | Liu | G06N 5/003 |
| 2020/0234144 A1* | 7/2020 | Such | G06F 40/42 |
| 2020/0320349 A1* | 10/2020 | Yu | H04L 9/3239 |
| 2020/0401929 A1* | 12/2020 | Duerig | G06N 3/084 |

(Continued)

OTHER PUBLICATIONS

Liu et al., "Generative Adversarial Active Learning for Unsupervised Outlier Detection" IEEE Transactions on Knowledge and Data Engineering, Sep. 2018 (Year: 2018).*

*Primary Examiner* — Theodore C Parsons
*Assistant Examiner* — Alan L Kong
(74) *Attorney, Agent, or Firm* — Hewlett Packard Enterprise Patent Department (57) ABSTRACT

In exemplary aspects, a golden data structure can be used to validate the stability of machine learning (ML) models and weights. The golden data structure includes golden input data and corresponding golden output data. The golden output data represents the known correct results that should be output by a ML model when it is run with the golden input data as inputs. The golden data structure can be stored in a secure memory and retrieved for validation separately or together with the deployment of the ML model for a requested ML operation. If the golden data structure is used to validate the model and/or weights concurrently with the performance of the requested operation, the golden input data is combined with the input data for the requested operation and run through the model. Relevant outputs are compared with the golden output data to validate the stability of the model and weights.

19 Claims, 6 Drawing Sheets

(56) References Cited

U.S. PATENT DOCUMENTS

| | | | |
|---|---|---|---|
| 2021/0056411 A1* | 2/2021 | Jung | G06F 11/3466 |
| 2021/0097136 A1* | 4/2021 | Zhou | G06F 40/211 |
| 2021/0125053 A1* | 4/2021 | Faibish | G06N 3/082 |

* cited by examiner

RESILIENCY FOR MACHINE LEARNING WORKLOADS

BACKGROUND

Machine learning (ML) is becoming an integral part of daily life, with important decisions being dependent on machine learning solutions. In working towards these solutions, machine learning workloads employ functions in which the results depend on machine learning models and weights. The validity of these models and weights therefore dictates the reliability and usefulness of machine learning solutions.

BRIEF DESCRIPTION OF THE DRAWINGS

Certain examples are described in the following detailed description and in reference to the drawings, in which.

DETAILED DESCRIPTION

In the foregoing description, numerous details are set forth to provide an understanding of the subject matter disclosed herein. However, implementations may be practiced without some or all of these details. Other implementations may include modifications and variations from the details discussed above. It is intended that the appended claims cover such modifications and variations.

Existing machine learning workloads are defined by functions (e.g., $f_m = \sigma(WX+B)$) that use models and/or weights to provide results. These models and their weights are stored in memory accessible by computing devices. Because the models and weights can be tampered (e.g., changed, removed) or corrupted, the models and weights are often secured and their resiliency improved by, for example, encrypting the machine learning workload's executables, weights and models, and, in turn, decrypting the encrypted data for deployment. One non-limiting example of corruption of the model and/or weights is caused by soft errors, which are becoming more commonplace even at lower elevations (e.g., due to shrinking transistor sizes). In some instances, even small errors can continuously accumulate such that they can cause erroneous outputs or results from a ML model.

As the machine learning workloads become more advanced and complex, the size of the model and weights also increases. Accordingly, the encrypting and decrypting of the increasingly larger weights and models cause the performance (e.g., compute, memory) of the machine learning workloads and/or of the systems deploying the models to likewise be increasingly impacted. Moreover, validating the stability of a large set of weights (e.g., periodically and/or in connection with ML operation requests) can be computationally intensive. There is a need therefore for systems and methods that can provide resiliency for machine learning workloads, including resiliency of the model and/or weights of the workloads. As described herein, in some embodiments, resiliency of models and weights can be provided using a data structure ("golden data" or "golden data structure") of substantially smaller size than the size of the weights. As described herein, the golden data is made up of one or more sets of inputs and expected or known outputs.

The examples provided herein describe the use of golden data to validate the stability of models and/or weights, thereby improving the resiliency of the machine learning workloads. The validation of the stability of the models can be performed using hardware and/or software implementations. More specifically, as described herein, a system stores golden data in an associated memory. In some embodiments, the golden data can be stored in a secure memory, which can be a trusted or protected region within the system memory, or can be another memory such as an on-chip memory of a processing element of the system.

In example embodiments, the system can validate the stability of a model and its weights using golden data. Golden data corresponding to an ML model can be retrieved from a memory and/or secure memory, and decrypted if it is stored in an encrypted state. As described herein in further detail, the golden data includes golden input data and golden output data. The golden output data represents the expected, anticipated and/or valid outputs resulting from the processing of the golden input data. In turn, the golden input data is fed or provided to the ML model that is to be validated. The ML model processes the golden input data, causing outputs or output data to be generated. The outputs represent the results of deploying the ML model. The outputs from the ML model are compared to the golden data outputs, which are the expected or anticipated outputs. If the ML model outputs match or are substantially similar (e.g., within a defined deviation amount, allowance or threshold), the model and weights are deemed to be validated and stable. On the other hand, if the actual and expected outputs do not match and/or are not substantially similar, the model and/or weights are deemed not validated. This means that the model and/or weights are defective or have been corrupted. If so, corrective actions can be taken, such as replacing the weights of the model with the correct or valid weights, shutting down the system and/or preventing the deployment of the model until any issues therewith are addressed.

In some embodiments, the validation of the model and weights using the golden data can be performed at periodic intervals and/or as triggered by particular actions. For instance, the validation can be performed prior to and/or after the deployment of the model for an ML operation, or between two ML operations.

In some embodiments, the validation can be performed concurrently with the deployment of the model for a requested ML operation. In such embodiments, the system is configured to receive requests to perform ML operations, such as predictions, classifications and others known to those of skill in the art. A ML operation request can include, among other things, input data and the batch size of the input data (e.g., the number of data points in the input data). The input data includes input data points that are to be fed into and processed by a ML model—which can be a chosen or optimal model for performing the requested ML operation. Golden data corresponding to the ML model is retrieved from the memory and/or the secure memory and, if needed, decrypted. An input batch for the ML model is formed using the input data from the request and the golden input data of the golden data. The ML model is run using the input batch, causing output data and/or results to be generated. From the output data, output values corresponding to the golden input data are extracted. The extracted output values corresponding to the golden input data (which represent actual outputs) are compared to the golden data outputs (which represent expected outputs) to validate the model and/or weights. That is, if the actual and output values deviate beyond a deviation allowance or threshold, the model and/or weights are determined to be faulty or corrupted. On the other hand, if the model is validated due to the actual and expected outputs not deviating beyond the allowance or threshold, the other output data corresponding to the input data of the operation request can be transmitted to a computing device, such as the device that requested the ML operation. The use of golden data to validate models and/or weights is now described in further detail with reference to FIGS. 1 to 6.

Figure 1:
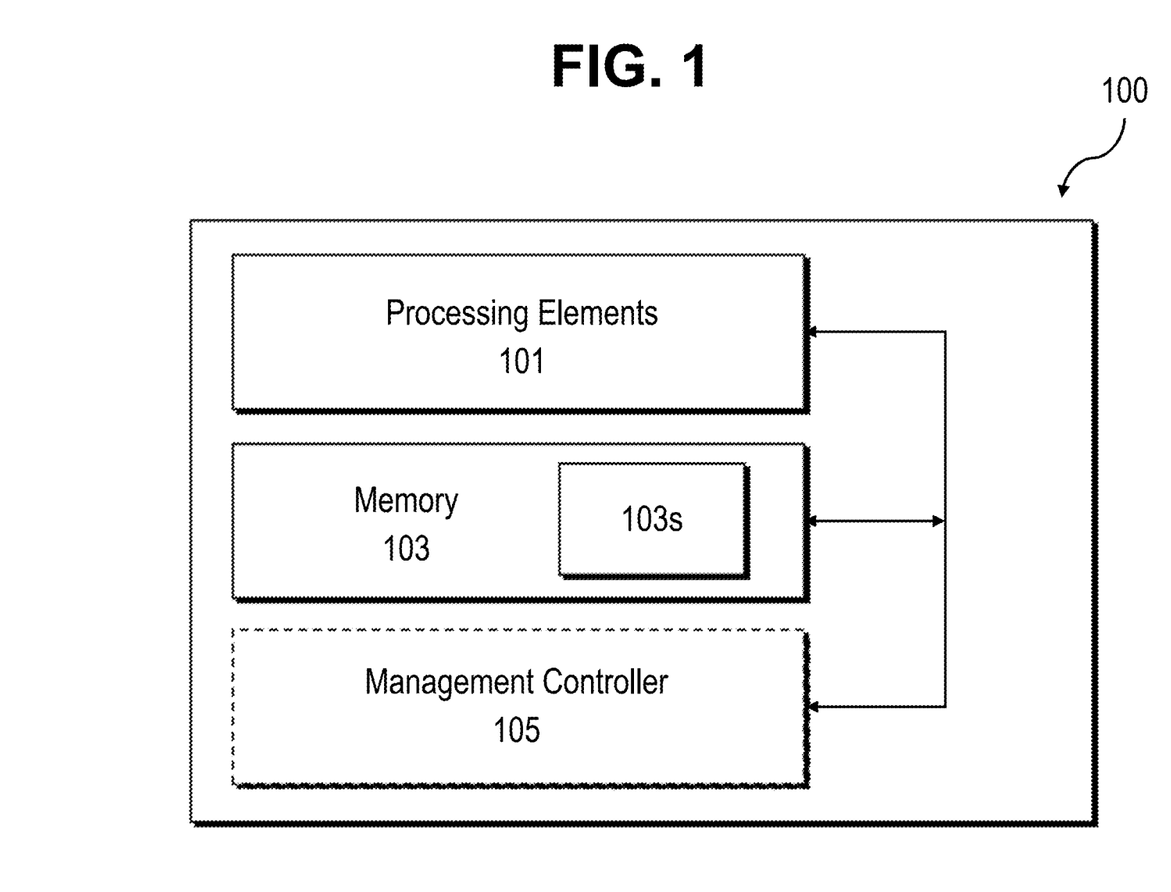
FIG. 1 illustrates an example of a system for processing machine learning workloads.

FIG. 1 is a diagram illustrating an example system 100 for processing machine learning workloads. In some embodiments, the system is referred to interchangeably as a "machine learning system" or "ML system." Machine learning workloads refer to a set of tasks or processes (e.g., model training, model deployment) performed to complete an operation such as an inference including prediction, classification, and the like. As described herein in further detail, the system 100 is configured to provide resiliency the machine learning workflows performed thereon or thereby by validating using golden data.

The system 100 can be a general purpose computing device such as a desktop computer, laptop computer, business server, blade server or any other type of computing device capable of performing the features and functions described herein. As shown in FIG. 1, the system 100 includes processing elements 101, memory 103, and a management controller 105. It should be understood that the system 100 can include more or fewer hardware and/or components than those illustrated in FIG. 1. For instance, the system 100 can include controllers (e.g., memory controllers, network controllers), interfaces (e.g., input/output (I/O) interfaces), network), peripheral devices, sensors, and others known to those of skill in the art. These, and/or the processing elements 101, memory 103 and management controller 105 can be communicatively coupled to one another via one or more buses of the system 100 that enable communications therebetween.

The processing elements 101 of the system 100 can be or refer to one or multiple processors (e.g., microprocessor, conventional processor, controller, microcontroller, state machine, sequencer), one or more cores of a multi-core processor, and/or any other hardware processing device circuitry. In some embodiments, the processors can be or include one or more of a central processing unit (CPU), a semiconductor-based microprocessor, a graphics processing unit (GPU), a field-programmable gate array (FPGA), an application-specific integrated circuit (ASIC). The processing elements 101 can be dedicated and configured hardware circuitry and/or hardware that can fetch and execute machine-readable instructions to perform, among other things, the functionality described herein (e.g., providing machine learning resiliency).

The system 100 can include one or more types of tangible, non-transitory, computer-readable media, such as memory (or "system memory") 103. As described in further detail below, the memory 103 can be used to provide resiliency for machine learning processes and workflows. The memory 103 can be or include random access memory (RAM), including volatile memory such as static random-access memory (SRAM) and dynamic random-access memory (DRAM); non-volatile memory such as memristors or memristor-based RAM, dot product engine (DPE), resistive random-access memory (RRAM), non-volatile resistive random access memory (ReRAM), conductive-bridging memory element RAM (CBRAM), flash memory, ferroelectric RAM (FeRAM), magnetoresistive RAM (MRAM), phase-change RAM and any other suitable memory types or combination thereof. It should be understood that the system 100 can also include other tangible, non-transitory, computer-readable storage media, such as storage devices for the long-term storage of programs and data.

Moreover, the system 100 can include secure memory 103s. The secure memory 103s can be or refer to part of the memory 103, or can be or refer to on-chip memory of the processor 101 and/or the management controller 105. All or portions of the secure memory 103s can be encrypted using a variety of encryption techniques known to those of skill in the art. In some embodiments, all or portions of the secure memory 103s can be configured with different permissions (e.g., read, write) for different components (e.g., processor 101, management controller 105), processes, tasks, and the like. In this way, data stored in the secure memory 103s can benefit from heightened protection. As described in further detail below, the secure memory 103s can be used to securely store data for machine learning processes or workflows, and/or for providing resiliency therefor. Examples of such data include the weights of a trained machine learning model and/or a golden data structure.

In some embodiments, the system 100 can be configured such that only certain devices having sufficient permissions or capabilities can program or store the golden data structures (e.g., in the secure memory 103s). For instance, an administrator computing device can implement a driver that enables programming of the golden data in the secure memory. On the other hand, other computing devices may not have access to that driver and/or to the ability to program the golden data.

In some embodiments, the system 100 can include a management controller 105 dedicated and/or configured to perform specific functions on or for the ML system 100. As described herein, the management controller 105 can be a specialized microcontroller embedded on a motherboard of a system such as the ML system 100. In some embodiments, the management controller can include one or more processing elements and memory. The management controller 105 (and/or its memory) can include additional security measures, and can therefore be used to perform functions that require or would optimally be more performed more securely. These can include, for example, retrieving, decrypting and transmitting data to be used to provide resiliency of machine learning processes and workflows.

The memory of the management controller 105 can be or include volatile and non-volatile memory. Moreover, although not illustrated in FIG. 1, the management controller 105 can include various other circuitry or components such as controllers and interfaces, as known to those of skill in the art. It should be understood that, although the management controller 105 is illustrated separately in FIG. 1, the management controller 105 (and/or its functionality) can refer to and/or be included in the processing elements 101.

Figure 2:
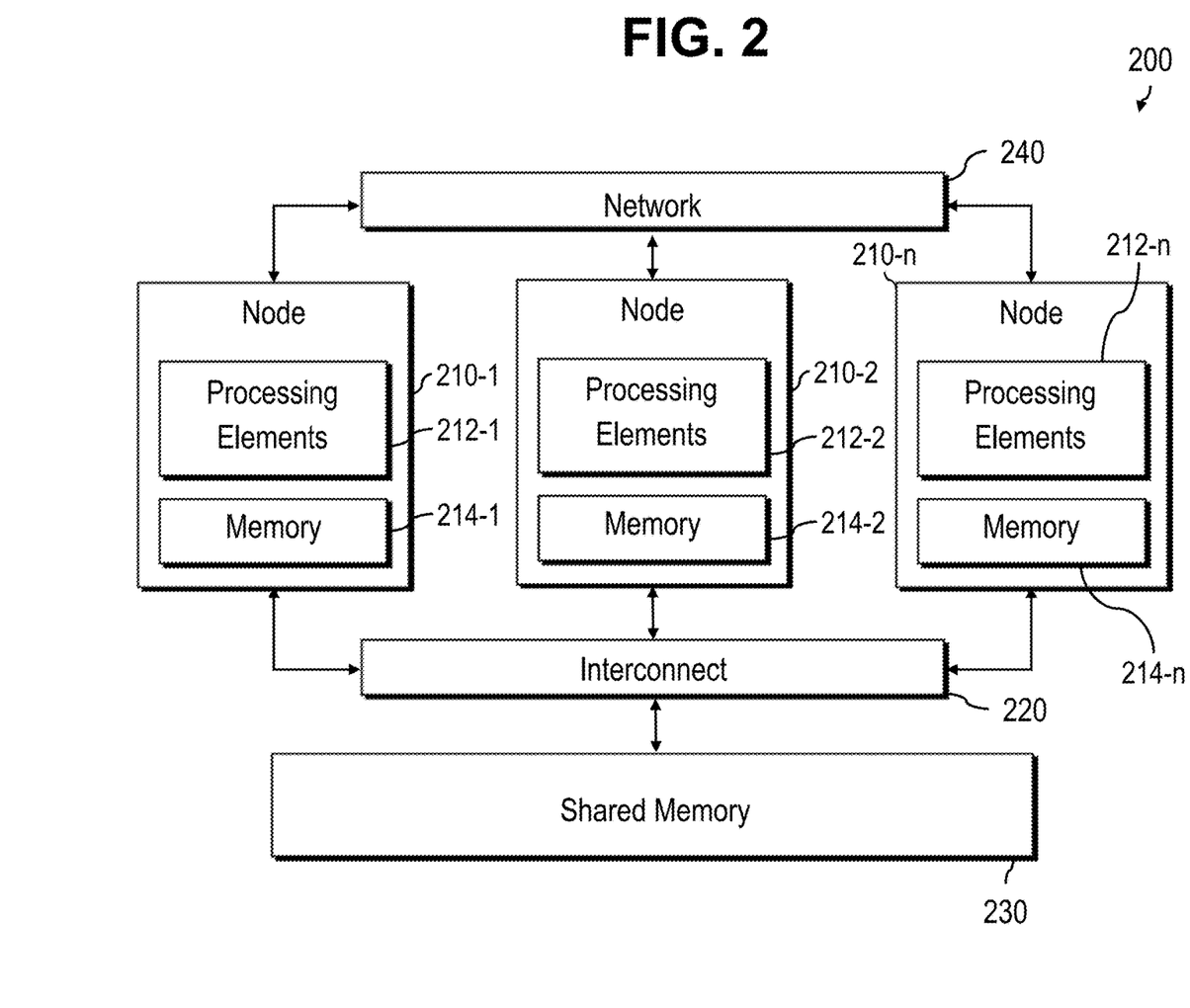
FIG. 2 illustrates an example of a computing system, such as the system for processing machine learning workloads of FIG. 1.

It should be understood that the system 100 can be a single, stand-alone device or node, or can be made up of multiple devices or nodes, for instance, as shown in FIG. 2. FIG. 2 is a diagram illustrating an example computing system 200. The system 200 includes computing nodes 210-1, 210-2, . . . , and 210-n (collectively "210" or "nodes 210"). In some embodiments, the system 100 of FIG. 1 can be or include one, multiple, or all of the computing nodes 210 of FIG. 2.

More specifically, the system 200 includes the nodes 210, which can be communicatively coupled to the shared memory 230 via an interconnect 220. Each of the nodes 210 can include processing elements (e.g., 212-1, 212-2, 212-$n$) and memory (e.g., 214-1, 214-2, 214-$n$), which can be directly attached thereto. It should be understood that the memory and processing elements of each of the nodes can vary. Moreover, the nodes 210 can include various other hardware components or circuitry, as known to those of skill in the art. For instance, the nodes 210 can include a bridge or the like that provides a connection or communicative coupling to the interconnect 220. The interconnect 220 can be or include one or a combination of communication networks, such as Ethernet, InfiniBand, Fibre Channel, and SeaStar. The shared memory 230 can be or refer to a collection of distributed memory of a plurality of devices, which can be volatile or non-volatile memory.

The nodes 210 are communicatively coupled, for example, via the network 240, which can be or include one or more wired or wireless networks such as a public data network (e.g., the Internet), local area networks (LANs), wide area networks (WANs), metropolitan area networks (MANs), cable networks, fiber optic networks, combinations thereof, or the like.

Figure 3:
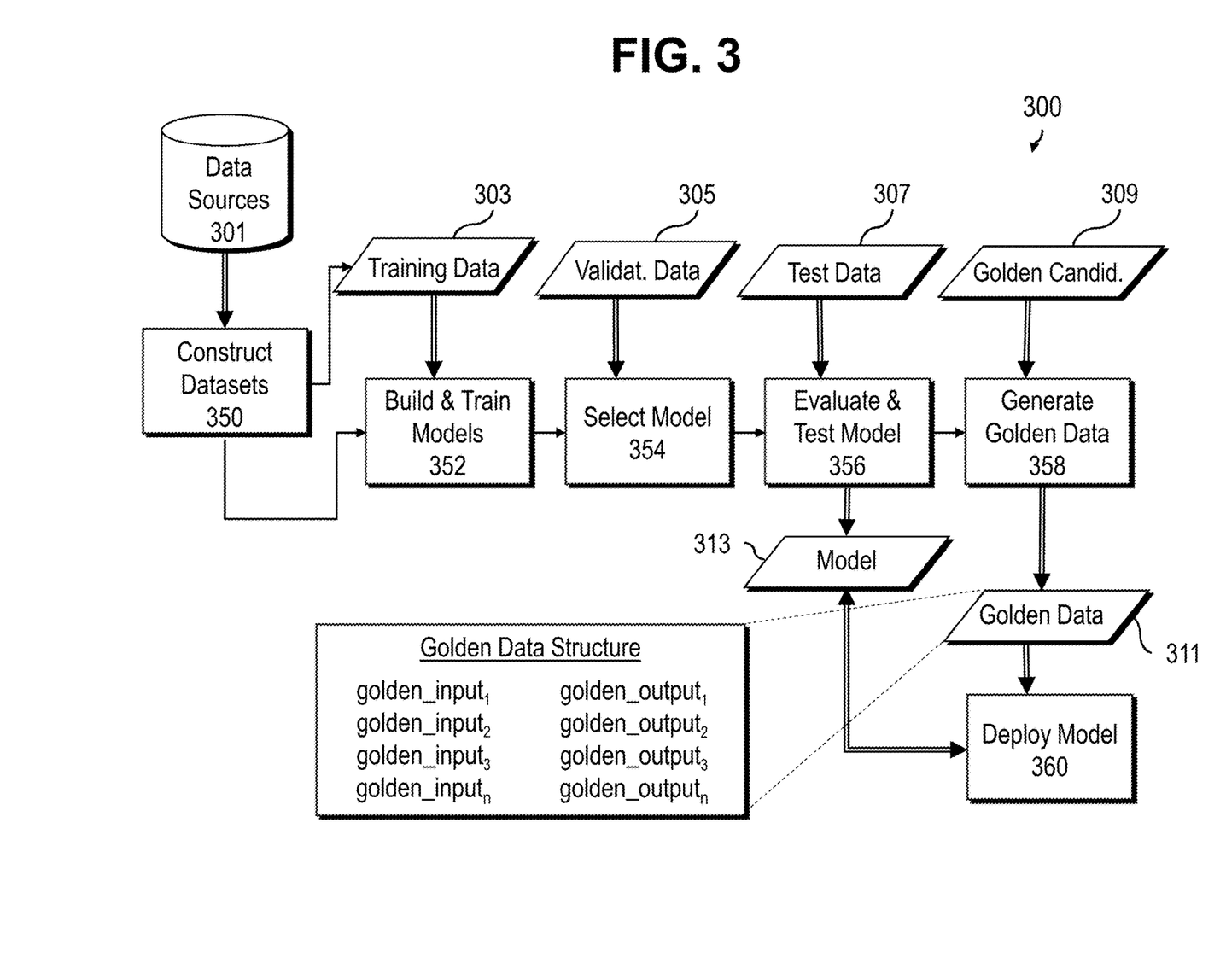
FIG. 3 illustrates an example of a machine learning workflow that includes the generation of golden data.

The system 100 can be used to perform one or more processes of a machine learning workflow. FIG. 3 illustrates an example machine learning workflow 300 which, notably, includes a process for generating golden data that, as described herein, can be used to provide resiliency. It should be understood existing processes, techniques, tools, resources, data, and the like that are known to those of skill in the art can be used in connection with the ML workflow 300.

Initially, at step 350 of the ML workflow 300, a dataset is constructed at step 350 by gathering or collecting data from any number of data sources 301. The data sources 301 can be or refer to one or a combination of any private or public file, database, repository, sensor, system, and the like. In the construction of the dataset at step 350, the gathered, raw data is pre-processed as needed for the intended purposes of the model to be built. For instance, the raw data can be converted to other types, missing data can be removed or filled in, and outliers or potentially erroneous data can be detected and removed. Other pre-processing techniques known to those of skill in the art can be performed on the collected, raw data, including, for instance, tokenization, lowercasing, stopword removal, and lemmatization.

The construction of the datasets at step 350 can result in one or more datasets such as training data 303, validation data 305, test data 307, and/or golden data candidates 309. In some embodiments, two or more of the data or datasets 303-309 can have at least a portion of overlapping data. For example, as described in further detail below, the golden data candidates 309 can include data from another one of the datasets such as the test data 307.

At step 352 of the ML workflow 300, the training data 300 is used to build and train models. It should be understood that the models can be any type of model including, for example, regression, classification, clustering and association models, and the like, that use supervised, unsupervised, semi-supervised, and/or reinforcement learning. In turn, a best model is selected at step 354 from among the models trained at step 352. The model selection of step 354 is performed using validation data the trained models of step 352. In some embodiments, the validation data 305 is unseen data—meaning data not previously processed by the trained models. Thus, when the trained models are run with the validation data 305, it is possible to assess the skills of the models on unseen data.

In turn, at step 356, the selected model is finally tested or evaluated using the test data 307 to assess its results (e.g., precision, accuracy, etc.). In some embodiments, the test data 307 is separate and distinct from the training data 303 and the validation data 305, such that the selected model does not see the test data 307 prior to the testing of the model at step 356. It should be understood that steps 352 to 356 can be performed iteratively, in whole or in part, as needed to obtain an optimal model. The selected model 313 and/or its weights can be stored in a memory of the system 100, as described in further detail below. In some embodiments, the weights of the model 311 can be stored separately in a memory region of heightened security, such as the secure memory 103$s$ described above with reference to FIG. 1.

At step 358, golden data (or "golden data structure") is generated using the golden data candidates 309. In some embodiments, the golden data candidates 309 can refer to another dataset (e.g., test data 307), overlap with one or more of the other datasets, and/or can be a dataset that is distinct from the other datasets. The golden data candidates 309 is made up of data points, from which one or more are selected and used to generate the golden data structure 311, which can in turn be used to validate the stability of the model and/or weights. In some embodiments, the data points that are selected for the golden data structure 311 are data points identified as being highly and/or most susceptible and/or sensitive to changes to the model and/or weights. This susceptibility can refer to the output corresponding to a data point being more impacted (e.g., relative to outputs corresponding to other data points) by changes to the model and/or weights.

For instance, if trained model is used for classification such that the output of the model is a probability score, the one or more data points that are selected for the golden data structure 311 are those that have the lowest probability score (e.g., lowest certainty) but for which the model still correctly predicts the output. As described herein, the generated golden data can be programmed onto a secure memory by an administrator computing device or the like having sufficient permissions or capabilities. At step 358, the model from step 356 is run using the data points of the golden data candidates 309 as inputs. The outputs corresponding to each of the input data points are analyzed, and one or more which are deemed to be uniquely susceptible or sensitive are selected for the golden data 311. In some embodiments, the selected data points are those for which the corresponding model outputs are correct but of low certainty—meaning that if the model and/or weights were altered from their original and validated states, the data points' low certainty output and proximity to a decision threshold could more easily cause them to fall on the other side of that decision threshold.

As shown in FIG. 3, the golden data structure 311 is made up of one or more golden inputs (golden_input$_1$, . . . , golden_input$_n$) and corresponding golden outputs (golden_output$_1$, . . . , golden_output$_n$). The golden outputs represent the expected or anticipated model outputs when the selected model is run using the golden inputs. Thus, if the model is run using the golden inputs and the golden outputs are generated, this indicates that the model and/or its weights are not faulty or corrupted. On the other hand, if the model is run using the golden inputs and the golden outputs are not generated, then it is possible to infer that the model and/or its weights are faulty or corrupted. As described in further detail below, corrective measures could be taken to address issues with the model. The model can be deployed at step 360 to process input data. Prior to, concurrently with, or after deploying the model for input data, the model can be run with the golden data to check whether it is functioning properly and/or is not corrupt.

Figure 4:
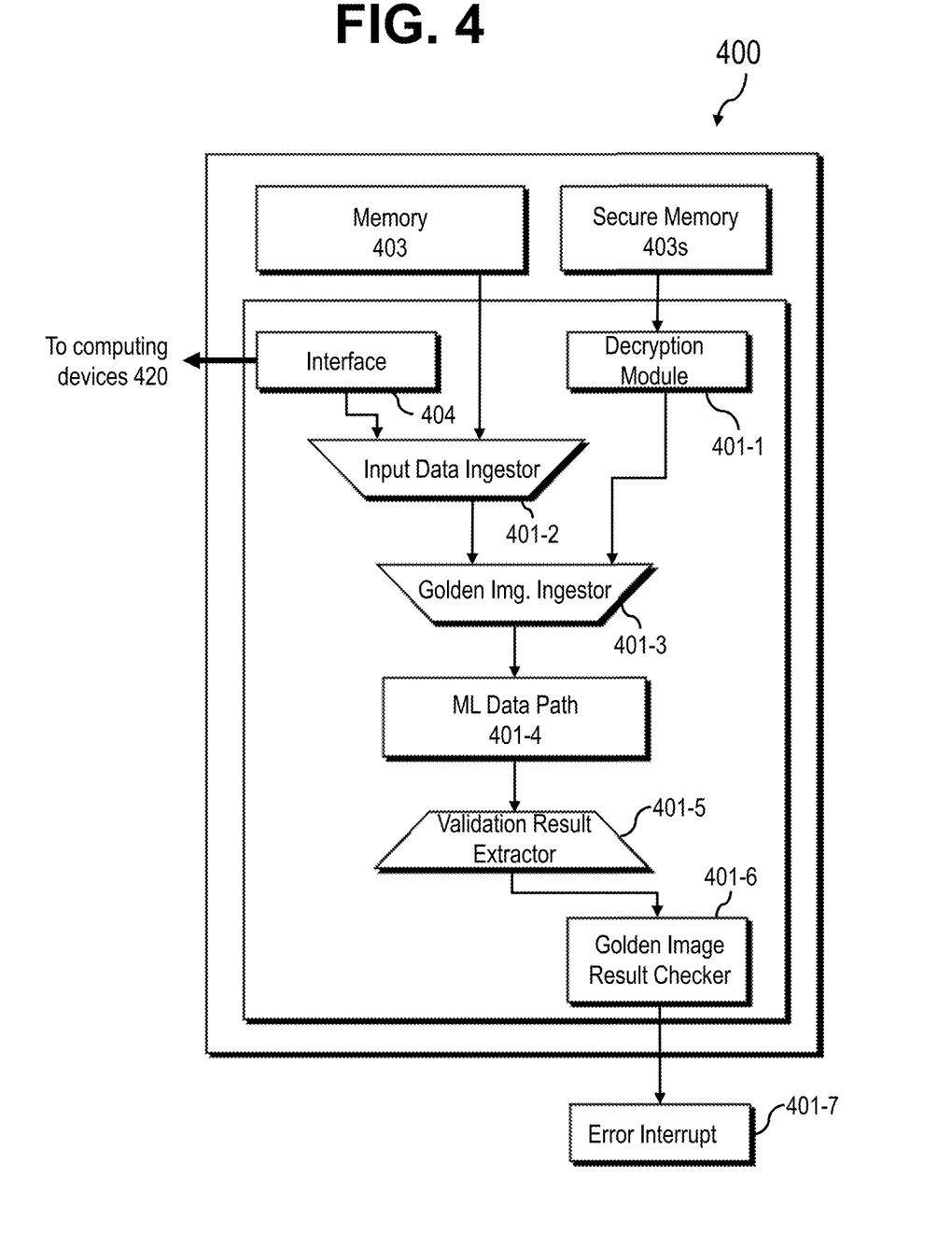
FIG. 4 illustrates an example of a system for deploying a machine learning model.

FIG. 4 is a diagram of an example system 400 for deploying a machine learning model. It should be understood that FIG. 4 illustrates one example embodiment in which resiliency is provided by checking golden data concurrently with the deployment of the model for an input batch of data. However, in other example embodiments, the golden data can be checked independent of the deployment of the model for an input batch of data. The system 400 can include hardware 401 (e.g., sequencer, state machine) such as circuit that includes logic and memory devices or storage elements. The hardware 401 can include hardware modules such as those described below with reference to FIG. 4. The logic of the hardware 401 and/or the modules is configured to execute one or more of the functions, processes and/or methods described herein (e.g., decrypting, combining and feeding data, checking results, etc.), including those for deploying a machine learning model and providing resiliency therefor. It should be understood that, in some embodiments, the hardware 401 can refer to one or more processors, and the logic can refer to machine readable instructions executed by the one or more processors.

The system 400 also includes memory 403 and/or secure memory 403s. It should be understood that, although illustrated separately in FIG. 4, the secure memory 403s can be or refer to a secured region of the memory 403. The memory 403 can store data, such as the model and/or model weights. The secure memory 403s can be an encrypted or protected memory portion such as secure enclave (e.g., trusted zone, software guard extension (SGX)). In one example embodiment, the secure memory 403s stores a golden data structure, which as described above includes golden data inputs and corresponding golden data outputs that are used to verify the integrity of the model and/or weights. The golden data structure can be encrypted and signed, and the signature can be periodically verified—e.g., by an operating system, firmware or other protected code running in an encrypted portion of the memory such as a secure. In some embodiments, the golden data structure can be loaded onto a system and/or stored thereon (e.g., in the secure memory) via an administrator level computing device having sufficient privileges. This can be done, for example, during a firmware update process or a machine learning model update procedure. It should be understood that changes to or updates of the golden data structure stored in the secure memory 403s cannot be made when the machine learning model is being deployed.

By storing the golden data structure in the secure memory 403s, the integrity of the golden data can be guaranteed and/or optimally retained. Access to the secure memory 403s and/or to the golden data structure stored therein can be restricted—such that specific components or processes can read and/or modify it. For instance, in some embodiments, a device having heighted security permissions such as a management controller (e.g., management controller 103) can access the golden data structure. It should be understood that in some embodiments, the secure memory 403s can be on-chip memory, such as memory of a processor (e.g., processor 101, management controller 103). Moreover, in some embodiments, the golden data structure can be managed and input into a machine learning process by an operating system, firmware (e.g., through root of trust), or from secure enclaves.

The golden data structure is used to check the accuracy and/or stability of the corresponding ML model. In some embodiments such as that illustrated in FIG. 4, this is performed during deployment of the ML model (e.g., for a prediction or inference operation). However, it should be understood that the use of the golden data structure to check the accuracy of the ML model and/or weights can be performed at any time, including for example, at gaps between two operations using the model, and/or at any other fixed or random moments or intervals or time, and/or as triggered based on determined criteria. In some embodiments, the model can be deployed based on a request to perform a machine learning operation, such as a prediction or inference. The request can be received by interface 404 or the like, via which the system 400 can communicate with other computing devices 420 (e.g., user computing devices, administrator computing devices). It should be understood that the interface 404 can be or include any number of interfaces, input/output and/or communication means known to those of skill in the art. The machine learning operation request can include input data that is intended to be fed into the inputs of the ML model for processing (e.g. making predictions thereon or inferences therefrom). The input data is fed or transmitted by the interface 404 to the input data ingestor 401-2. The input data ingestor 401-2 receives and combines the input data from the interface 404 along with other data (e.g., model data such as weights, model structure, etc.) from the memory 403.

The data combined by the input data ingestor 401-2 and the golden data structure decrypted by the decryption module 401-1 are fed to the golden image ingestor 401-3. It should be understood that, as described herein, a "golden image" refers to or can be/include any type of input, instance, example or other data (interchangeably referred to as "golden input," "golden data," "golden example," "golden instance). The golden image ingestor 401-3 combines the golden input data of the decrypted golden data structure with the data received from the input data ingestor 401-2. That is, the golden image ingestor 401-3 can use the combined data to create an input batch for input into the ML model data path. In some embodiments, the input batch includes input data points having corresponding indices. Notably, the system 400 can track which of the indices in the input batch correspond to data points from the golden data structure, and which of the indices correspond to data points from the input data received from the interface 404. This can be done, for instance, by the golden image ingestor 401-3 storing the index of the golden input data and transmitting that information to the golden result extractor. Moreover, as shown in FIG. 4, the golden image ingestor 401-3 can transmit information such as the golden output data obtained from the decrypted golden data structure to the golden image result checker 401-6. As described in further detail below, the golden output data can be used by the golden image result checker 401-6 to determine if there are any issues with the model and/or weights.

The input batch generated by the golden image ingestor 401-3 is fed through the ML data path 401-4 of the ML model. The outputs or results of the ML data path of the model are fed or transmitted to the golden image result extractor 401-5, which can extract the outputs or results (e.g., inferences, predictions) corresponding to (e.g., resulting from) inputs of the golden input data—that is, it can separate the model outputs or results that correspond to the golden input data from the model outputs or results that correspond to the input data received in the ML operation request.

The model outputs or results corresponding to the golden input data are transmitted to the golden image result checker 401-6. The golden image checker 401-6 can identify errors or corruptions of the model and/or its weights by comparing (i) the model outputs or results received from the golden image result extractor, with (ii) the golden output data (e.g., expected or anticipated outputs or results) extracted from the decrypted golden data structure. Based thereon, if the golden image result checker cannot validate the golden image outputs or results—e.g., implying that an error exists or may exist in the model and/or its weights—an error interrupt is generated and the ML operation is aborted. The system 400 can take alternative or additional steps, such as corrective actions. One non-limiting example of a corrective action that can be taken when an error or corruption is identified is to replace the weights stored in the memory 403—which may be corrupt—and replace them with a valid set of weights. The valid set of weights can be obtained by the system 400 from another computing device and/or storage device. It should be understood that other corrective actions known to those of skill in the art can also or alternatively be taken in order to address the identified errors or corruptions of the model and/or weights.

If the golden image result checker 401-6 validates the golden image output or result, the ML output or results data, excluding the golden image outputs and/or outputs or results corresponding to the golden image data, is transmitted to the interface 404, where they can be sent to or made available to other computing devices (e.g., the requestor computing device) among the devices 420. It should be noted that, in some embodiments, if an error or corruption is detected by virtue of not being able to validate the golden image outputs or results, even if the results or outputs are not sent to the interface 404, a notification or the like indicating that a possible corruption or error has occurred can be transmitted to the interface 404 and, in turn, one or more of the computing devices 420.

Figure 5:
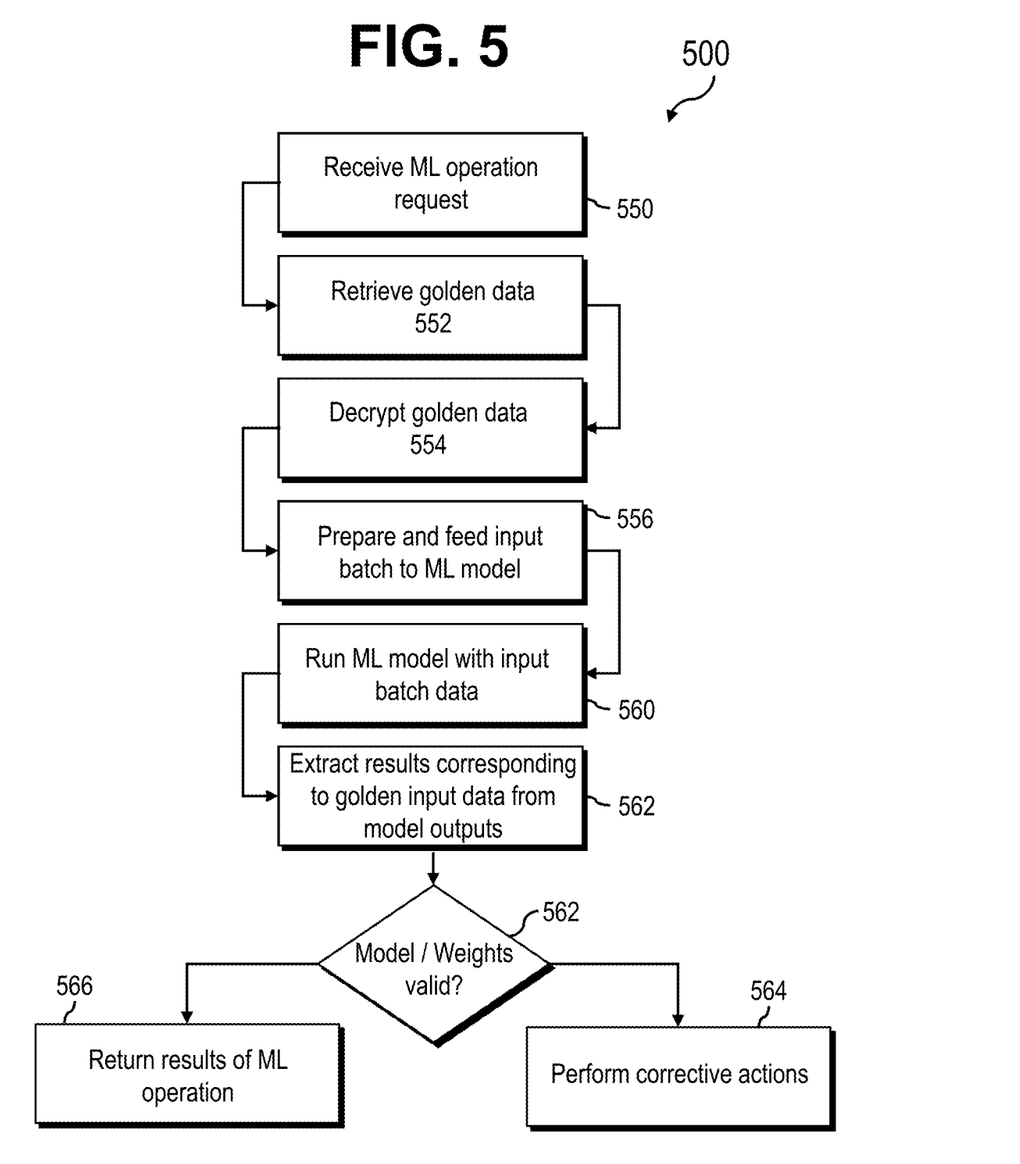
FIG. 5 illustrates an example of a process for deploying a machine learning model and validating the stability of the model and weights.

FIG. 5 is a flow chart 500 illustrating an example of a process for deploying a ML model and validating the stability of a ML model and/or its weights. In some embodiments, validating the stability of the ML model and/or its weights includes checking whether the weights are corrupt, faulty or otherwise defective. The process of FIG. 5 is can be performed by one or more of the systems (e.g., systems 100, 200, 400) described herein and/or by their processing elements, processors, and/or other hardware (e.g., hardware modules). In some embodiments, the process of FIG. 5 can correspond to software, code and/or machine readable instructions stored in a memory of or associated with the system and executed by one or more of the system's processing elements, processors or other hardware. The process illustrated in the flow chart 500 can validate the stability of the model and/or its weights by running the model with the golden data and with the input data associated with the ML operation request. However, it should be understood that, as described above, the validation of the model and/or weights by running the model with the golden data can be performed separately from the running of the model with the input data of the ML operation request, for instance, at random or periodic intervals. The frequency of the golden data validation can be increased or decreased as deemed optimal for the resources of the system and/or for the intended purposes of the data. For instance, an application of higher security or greater risk, such as an autonomous car ML system or accelerator would perform the golden data validation with more frequency.

At step 550, an ML operation request is received. The ML operation request can be received from a communicatively coupled computing device (e.g., user computing device, requestor computing device). In some embodiments, the ML operation request can be triggered by the requester computing device calling a function such as predict ( ). The ML operation request can include input data to be processed by the ML model and a batch size indicating the number of data points within the input data (e.g., predict(inputdata, batchsize)). The input data is the data from which inferences, predictions, classifications, and the like are to be made by the ML model. Table 1 below illustrates an example of input data received in connection with an ML operation request, having a batch size n.

TABLE 1

| Input Data Point | $X_1$ | $X_2$ | $X_3$ | ... | $X_4$ | $X_n$ |
|---|---|---|---|---|---|---|
| Index | 0 | 1 | 2 | ... | 3 | n − 1 |

In some embodiments, the input data can be fed directly to the ML model and the outputs or results of the model transmitted back to requestor computing device. In such embodiments, the validating of the stability of the model and/or weights can be performed prior to and/or or after the said ML operation. Nonetheless, in the example embodiment illustrated in FIG. 5, the model and/or its weights can are validated concurrently with the processing of the input data for the ML operation, by also running the ML model with the golden data.

At step 552, golden data is retrieved from a memory of the system. The golden data is a data structure that can include one or more golden data points and a corresponding batch size indicating the number of golden data points. Golden data points can include pairs of golden input data points and golden output data points. The golden output data points are the values that are expected or anticipated to be output or result from the ML model processing the golden input data points. Table 2 below illustrates an example of golden data having a batch size p. However, it should be understood that the golden data can include one or any number of golden data inputs.

TABLE 2

| Golden Data Points | [$gin_1$, $gout_1$] | [$gin_2$, $gout_2$] | ... | [$gin_p$, $gout_p$] |
|---|---|---|---|---|
| Index | 0 | 1 | ... | p − 1 |

In the example shown in Table 2, the golden data point at index 0 of the golden data is made up of a golden input data point $gin_1$ and a corresponding golden output data point $gout_1$.

As described above, the golden data can be encrypted and stored in a secure memory, which can be a protected or trusted memory region of the main memory of the system, and/or the memory of a processor or processing element (e.g., processor, management controller). At step 554, the golden data retrieved at step 552 is decrypted—resulting in an unencrypted set of golden input data and corresponding golden output data. It should be understood that the golden data that is retrieved at step 552 is the golden data corresponding to the ML model to be deployed for the requested ML operation.

In some embodiments, one or more of the steps of retrieving the golden data (552) and decrypting the encrypted golden data (554) can be performed by a processor or processing element having unique security permissions or capabilities. For instance, a management controller (e.g., FIG. 1, management controller 105) may have access to the secure memory or the portion of the secure memory where the golden data is stored, and can include or have access to keys that enable it to decrypt the encrypted golden data.

In turn, at step 556, input batch is (i) prepared such that it can be ingested by an ML model (e.g., via a function API), and (ii) fed to the ML model. Preparing the input batch can include combining (i) at least a portion of the data received at step 550 in the ML operation request (e.g., input data, input data batch size), and (ii) at least a portion of the golden data decrypted at step 554 (e.g., the unencrypted golden input data, batch size of the golden data). Table 3 below illustrates an example input batch having a batch size N. It should be understood that the input batch can have any number of ML operation input data points and golden input data points. In cases in which all of the input data points are included in the input batch, the batch size of the input batch will be equal to at least input data batch size+1, to account for at least one golden input data point. It should also be understood that the input batch and the golden data can be stored in indices in any order with the input data.

TABLE 3

| Input Batch Data Points | $X_1$ | $X_2$ | ... | $X_n$ | $gin_1$ | ... | $gin_p$ |
|---|---|---|---|---|---|---|---|
| Index | 0 | 1 | 2 | n − 1 | n | ... | N − 1 |

When preparing the input batch, the indices of the golden input data of the ML operation request and of the golden input data within the input batch can be tracked and/or stored. As described in further detail below, this information can be used to identify which of the ML model's outputs correspond to the golden data inputs. The prepared input batch is fed to the ML model, using any variety of techniques known to those of skill in the art and as optimal for the type and structure of the model. In some embodiments, each input batch data point is used as the value for a corresponding input node of the ML model. For instance, the model can include N number of input nodes i (e.g., $i_0$, $i_1$, $i_2$, ..., $i_{N-1}$). In such a configuration, each of the input nodes of the model includes a corresponding value from the input batch data, such that input node $i_0$ includes the value $X_1$, input node ii includes the value $X_2$, and so on. Moreover, in such a scenario, the golden input data points would be fed into the ML model at step 556 of FIG. 5 via input nodes $i_4$, ..., $i_{n-1}$.

In turn at step 558, the ML model is run using the input batch data prepared and fed at step 556. In some embodiments, the batch size of the input batch is also fed to the model. As discussed herein, the ML model can be any of a variety of models known to those of skill in the art. The input batch data fed into the model is therefore processed according to the model's algorithm, causing results (or "outputs," "model outputs") to be output by the model. The outputs of the model can likewise depend on the type of ML model. In some embodiments, the ML model is structured such that the outputs or results are provided via output nodes, and the number of output nodes of the model is configured to be the same as the number of input nodes. In the example described above with reference to step 556, the model includes N number of input nodes and N number of output nodes ($o_0$, $o_1$, ..., $o_{N-1}$). Table 4 below illustrates an example of model output data of batch size N:

TABLE 4

| Output Data Points | $Y_1$ | $Y_2$ | $Y_3$ | $Y_4$ | $Y_5$ | ... | $Y_n$ |
|---|---|---|---|---|---|---|---|
| Index | 0 | 1 | 2 | 3 | 4 | ... | N − 1 |

In some embodiments, the output nodes correspond to and/or provide a result for an input node having the same index. Thus, the result of running the value $X_1$ of the input node $i_0$ through the model is provided via output node $o_0$. In one example with reference to the output data of Table 4, the output data is made up of data points from the respective output nodes of the model. Thus, the value $Y_1$ in the output data (output_data[0]) is the value of output node $o_0$.

At step 560, output data points that that correspond to the golden input data are extracted from the model output data. As described above with reference to steps 554 and 556, the indices of the input batch that include the golden input data points are tracked. By virtue of this information, in some embodiments, it is possible to determine which of the data points in the output data correspond to the golden input data points—e.g., resulted from the golden input data. In some embodiments, if the stored or tracked indices indicate that the golden input data points were included in the input batch at input_batch[n] to input_batch[N−1], the output data points that correspond to the golden input data points are therefore determined to be included in the model output data at output_data[n] to output_data[N−1]. Thus, in one example embodiment with reference to Table 4, the output data points corresponding to the golden input data points are $Y_5$ to $Y_n$.

At step 562, the extracted output data corresponding to the golden input data is used to validate the stability of the model and/or its weights. In some embodiments, the validation of the model and/or its weights includes comparing the extracted output data from step 560 (e.g., the data points corresponding to the golden input data) to the golden data output data points obtained from the decryption of the golden data at step 554. If the comparison indicates that the values match—meaning that the relevant actual outputs of the model are the same as the expected outputs of the golden data—the model and/its weights are determined to be stable and valid (e.g., they have not been corrupted, damaged or otherwise altered or sufficiently altered to be deemed faulty). In some embodiments, a match can occur even when the actual outputs deviate from the expected outputs. The amount of deviation that is permitted can vary based on the particular use of the model (e.g., image classification, object detection, speech recognition). In some embodiments, a deviation sufficient to indicate that the model and/or weights are faulty can be a mean squared error metric defined as $1/N \Sigma_{i=1}^{N}(\hat{Y}_i-Y_i)^2$ where N is the number of numerical elements in the output Y.

If it is determined at step 562 that the model and/or weights are not stable and valid (e.g., because the actual outputs do not match the expected golden data outputs), one or more corrective actions can be performed at step 564. On the other hand, if indeed the model and/or weights are deemed to be stable and valid, at step 566, the results of the ML operation can be transmitted, for instance, to the requestor computing device that initiated the request received at step 550. The results transmitted at step 566 include the model outputs that do not correspond to the golden data inputs (e.g., $Y_1$ to $Y_4$ in example Table 4). It should be understood that the results transmitted at step 566 can also or alternatively include information based on the model outputs—e.g., resulting from post-processing of the model outputs.

The corrective actions performed at step 564 can include, for example, actions to remedy or minimize the impact of the errors and/or notify other systems or devices of the detected errors. One example of a corrective action performed at step 564 is to flush the weights of the model, which may have caused the detected error or corruption. That is, the model weights stored and/or used by the system for the deployment of the ML model can be replaced with original and/or valid weights obtained from a communicatively coupled memory (e.g., secondary memory). In some embodiments, the model can be re-deployed after the faulty weights are replaced with the original and valid weights. The re-deployment of the model can be performed using only the input data received in the ML operation request, or the input data and the golden data (as described above) to enable a re-validation of the model and/or its weights.

As described herein, the validation of the weights or models using golden data can be performed together with or separate from (e.g., before, after) a deployment of the ML model for a requested ML operation. In one embodiment in which the validation is performed prior to a requested ML operation, the system can flag an error or fault if the model and/or weights are not validated, and prevent or halt the processing of the ML operation.

Figure 6:
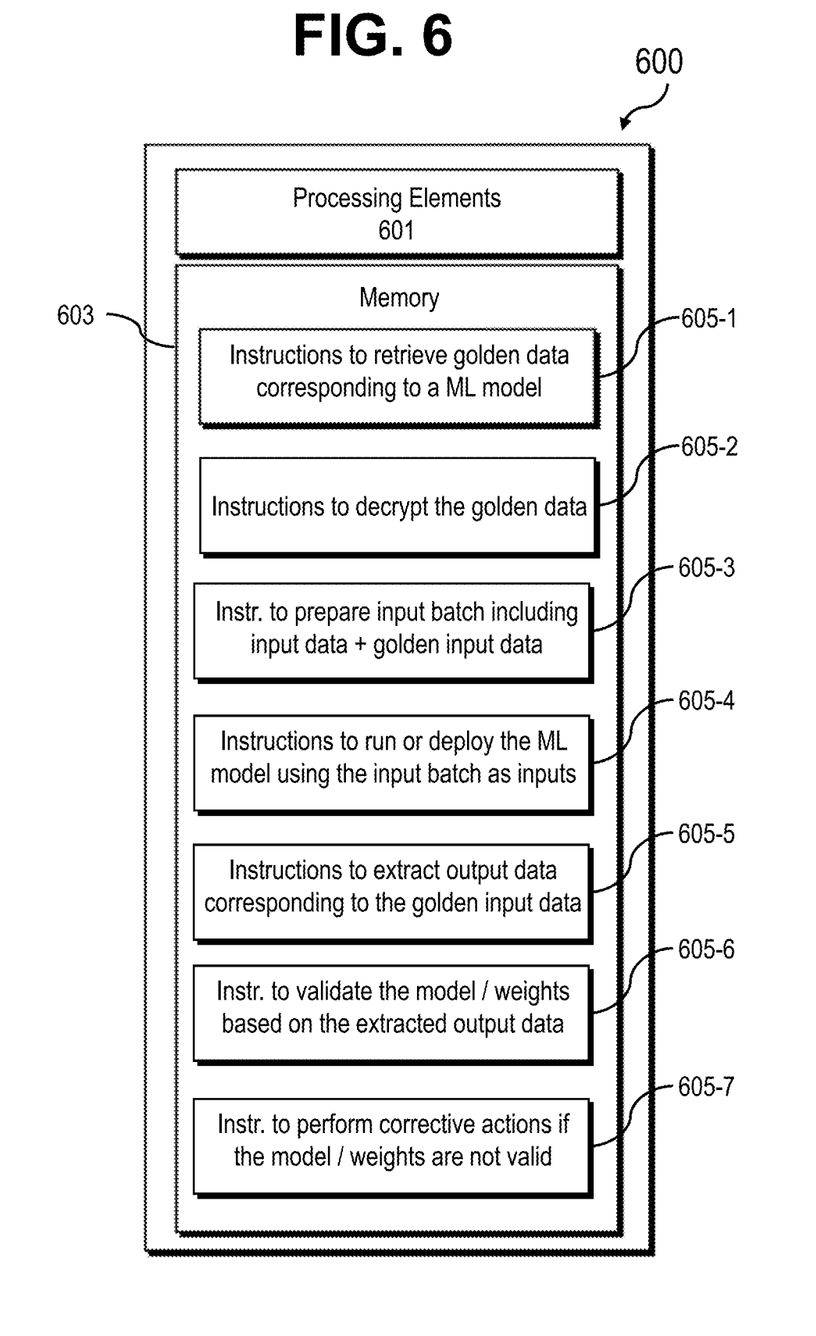
FIG. 6 illustrates an example of a system for validating ML models and weights.

FIG. 6 illustrates an example system 600 for validating ML models and weights. The system 600 includes processing elements 601 and memory 603. The processing elements are configured to perform or execute function, methods, processes and/or logic as described herein. In some embodiments, these methods, functions and/or processes can be embodied as machine readable instructions or code stored on a computer readable medium such as RAM, ROM, EPROM, EEPROM, such as the memory 603. These instructions can be executed by one or multiple processing elements 601 of the apparatus 600.

As shown in FIG. 6, the instructions can include instructions to retrieve golden data corresponding to a ML model (605-1); instructions to decrypt the golden data (605-2); instructions to prepare an input batch that includes input data and golden input data (605-3); instructions to run or deploy the machine learning model using the input batch as inputs (605-4); instructions to extract, from the outputs of the ML model results, output data corresponding to the golden input data (605-5); instructions to validate the model and weights based on the extracted output data corresponding to the golden input data (605-6); instructions to perform corrective actions if the model and weights are not valid (605-7); and instructions to provide relevant results of the ML model deployment. It should be understood that the instructions 605 can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

For instance, the instructions described herein may be implemented at least in part in any conventional computer programming language. For example, some embodiments may be implemented in a procedural programming language (e.g., "C"), or in an object oriented programming language (e.g., "C++"). Other embodiments may be implemented as a pre-configured, stand-alone hardware element and/or as preprogrammed hardware elements or other related components.

The instructions can be embodied in a computer program product which can be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Some embodiments may be implemented in a software-as-a-service model ("SAAS") or cloud computing model. Of course, some embodiments may be implemented as a combination of both software and hardware. Still other embodiments of the invention are implemented as entirely hardware, or entirely software.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A system comprising:
one or more processors, and
at least one memory communicatively coupled to the one or more processors, the at least one memory storing (i) a golden dataset, and (ii) instructions that, when executed by the one or more processors, cause the one or more processors to:
provide data points of golden data candidate datasets as input to a first machine learning (ML) model,
wherein outputs of the first ML model identify sensitive data points within the provided data points,
and wherein the outputs that correspond to the sensitive data points are more impacted by changes to weights of the first ML model relative to outputs that correspond to other data points within the provided data points;
generate a golden dataset using the sensitive data points;
receive a machine learning (ML) operation request comprising first input data on which the ML operation is to be performed using a second ML model;
retrieve, from the at least one memory, the golden dataset comprising golden input data and golden output data;
generate an input batch comprising the first input data and the golden input data;
run the second ML model using the input batch as inputs, causing the second ML model to generate output data comprising output data points;
determine a defined deviation threshold used in validating the output data from the second ML model, the defined deviation threshold being determined using a mean squared error metric associated with numerical elements generated in the output data from the second ML model;
compare the golden output data to the output data from the second ML model;
when the golden output data matches the output data within the defined deviation threshold, validate weights of the second ML model based on at least the output data points corresponding to the golden input data; and
wherein the weights of the second ML model are determined to be faulty if the output data points corresponding to the golden input data deviate beyond a permitted threshold from the respective golden output data points corresponding to the golden output data.

2. The system of claim 1,
wherein the golden input data comprises one or more golden input data points and the golden output data comprises one or more golden output data points each associated with a respective one of the golden input data points, and
wherein the validating of the weights of the second ML model comprises comparing (i) the output data points corresponding to the golden input data, with (ii) the golden output data points corresponding to the golden output data.

3. The system of claim 2, wherein the instructions that, when executed by the one or more processors, cause the one or more processors to: identify, during the generating of the input batch, indices of the input batch that include the golden input data point; extract, from the output data, the output data points corresponding to the golden input data based on the identified indices of the golden input data points in the input batch, wherein the output data points that correspond to the golden input data are located in the output data at indices corresponding to the identified indices.

4. The system of claim 2, wherein each of the golden output data points represents an expected output from the second ML model based on the processing of the respective golden input data point.

5. The system of claim 2, wherein the at least one memory includes a secure memory storing the golden dataset.

6. The system of claim 5,
wherein the golden dataset is encrypted, and
wherein the instructions, when executed by the one or more processors, further cause the one or more processors to decrypt the encrypted golden dataset.

7. The system of claim 2, wherein the instructions, when executed by the one or more processors, further cause the one or more processors to:
(i) return a result based on the output data generated by the running of the second ML model, or
(ii) execute one or more corrective actions.

8. The system of claim 7, wherein the executing of one of the one or more corrective actions includes:
obtaining new weights for the second ML model, the new weights being received valid weights corresponding to the second ML model;
replacing at least a portion of the weights of the ML model with the new weights;
re-running the second ML model using the input batch as inputs, causing the second ML model to generate new output data, the new output data comprising new output data points corresponding to the first input data and new output data points corresponding to the golden input data; and
validating the new weights of the second ML model based on at least the new output data points corresponding to the golden input data.

9. The system of claim 1, wherein the sensitive data points are determined based on: when the weights of the first ML model are changed, a certainty output and proximity to a decision threshold cause certainty of the data points to fall on another side of the decision threshold.

10. The system of claim 1, wherein the golden dataset is programmed onto a secure memory apart from the at least one memory, and the secure memory of the system is accessible by an administrator computing device having sufficient permissions or capabilities.

11. The system of claim 1, wherein validation of the weights of the second ML model is executed between two operations that use the second ML model.

12. A computer-implemented method comprising:
providing data points of golden data candidate datasets as input to a first machine learning (ML) model,
wherein outputs of the first ML model identify sensitive data points within the provided data points,
and wherein the outputs that correspond to the sensitive data points are more impacted by changes to weights of the first ML model relative to outputs that correspond to other data points within the provided data points;
generating a golden dataset using the sensitive data points;
receiving a machine learning (ML) operation request comprising first input data on which the ML operation is to be performed using a second ML model;
retrieving a golden dataset comprising golden input data and golden output data;
generating an input batch comprising the first input data and the golden input data;
running the second ML model using the input batch as inputs, causing the second ML model to generate output data comprising output data points;
determining a defined deviation threshold used in validating the output data from the second ML model, the defined deviation threshold being determined using a mean squared error metric associated with numerical elements generated in the output data from the second ML model;
comparing the golden output data to the output data from the second ML model;
when the golden output data matches the output data within the defined deviation threshold, validating weights of the second ML model based on at least the output data points corresponding to the golden input data; and
wherein the weights of the second ML model are determined to be faulty if the output data points corresponding to the golden input data deviate beyond a permitted threshold from the respective golden output data points corresponding to the golden output data.

13. The computer-implemented method of claim 12,
wherein the golden input data comprises one or more golden input data points and the golden output data comprises one or more golden output data points each associated with a respective one of the golden input data points, and
wherein the validating of the weights of the second ML model comprises comparing (i) the output data points corresponding to the golden input data, with (ii) the golden output data points corresponding to the golden output data.

14. The computer-implemented method of claim 13, further comprising:
identifying, during the generating of the input batch, indices of the input batch that include the golden input data point;
extracting, from the output data, the output data points corresponding to the golden input data based on the identified indices of the golden input data points in the input batch,
wherein the output data points that correspond to the golden input data are located in the output data at indices corresponding to the identified indices.

15. The computer-implemented method of claim 13, wherein each of the golden output data points represents an expected output from the second ML model based on the processing of the respective golden input data point.

16. The computer-implemented method of claim 12, wherein the golden dataset is encrypted, and wherein the method further comprises decrypting the encrypted golden dataset.

17. The computer-implemented method of claim 13, further comprising:
   (i) returning a result based on the output data generated by the running of the second ML model, or
   (ii) executing one or more corrective actions, the executing of one of the one or more corrective actions including:
      obtaining new weights for the second ML model, the new weights being received valid weights corresponding to the second ML model;
      replacing at least a portion of the weights of the second ML model with the new weights; and
      re-running the second ML model using the input batch as inputs, causing the second ML model to generate new output data, the new output data comprising new output data points corresponding to the first input data and new output data points corresponding to the golden input data; and
      validating the new weights of the second ML model based on at least the new output data points corresponding to the golden input data.

18. An apparatus comprising:
   one or more memory devices storing one or more golden datasets, and
   one or more hardware components configured to execute machine readable instructions stored in the one or more memory devices for performing a method comprising:
   provide data points of golden data candidate datasets as input to a first machine learning (ML) model,
   wherein outputs of the first ML model identify sensitive data points within the provided data points,
   and wherein the outputs that correspond to the sensitive data points are more impacted by changes to weights of the first ML model relative to outputs that correspond to other data points within the provided data points;
   generate a golden dataset using the sensitive data points;
   receive a machine learning (ML) operation request comprising first input data on which the ML operation is to be performed using a second ML model;
   retrieve, from the at least one memory, the golden dataset comprising golden input data and golden output data;
   generate an input batch comprising the first input data and the golden input data;
   run the second ML model using the input batch as inputs, causing the second ML model to generate output data comprising output data points;
   determine a defined deviation threshold used in validating the output data from the second ML model, the defined deviation threshold being determined using a mean squared error metric associated with numerical elements generated in the output data from the second ML model;
   compare the golden output data to the output data from the second ML model;
   when the golden output data matches the output data within the defined deviation threshold, validate weights of the second ML model based on at least the output data points corresponding to the golden input data; and
   wherein the weights of the second ML model are determined to be faulty if the output data points corresponding to the golden input data deviate beyond a permitted threshold from the respective golden output data points corresponding to the golden output data.

19. The apparatus of claim 18,
   wherein the golden input data comprises one or more golden input data points and the golden output data comprises one or more golden output data points each associated with a respective one of the golden input data points, and
   wherein the validating of the weights of the second ML model comprises comparing (i) the output data points corresponding to the golden input data, with (ii) the golden output data points corresponding to the golden output data.

* * * * *